Nov. 7, 1967  R. W. KEARNS  3,351,836

WINDSHIELD WIPER SYSTEM WITH INTERMITTENT OPERATION

Filed Dec. 1, 1964  3 Sheets-Sheet 1

INVENTOR
Robert W. Kearns

BY Lane, Aitken, Dunner & Ziems
ATTORNEYS

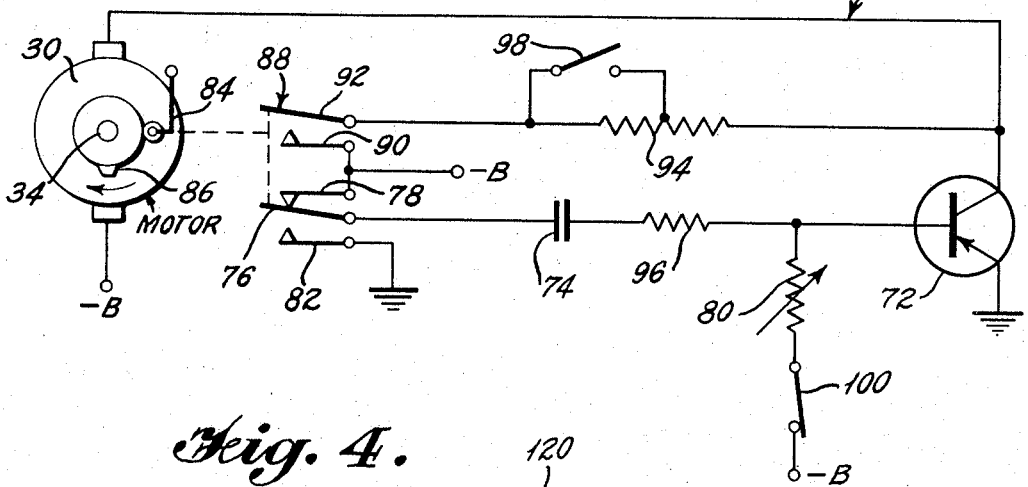
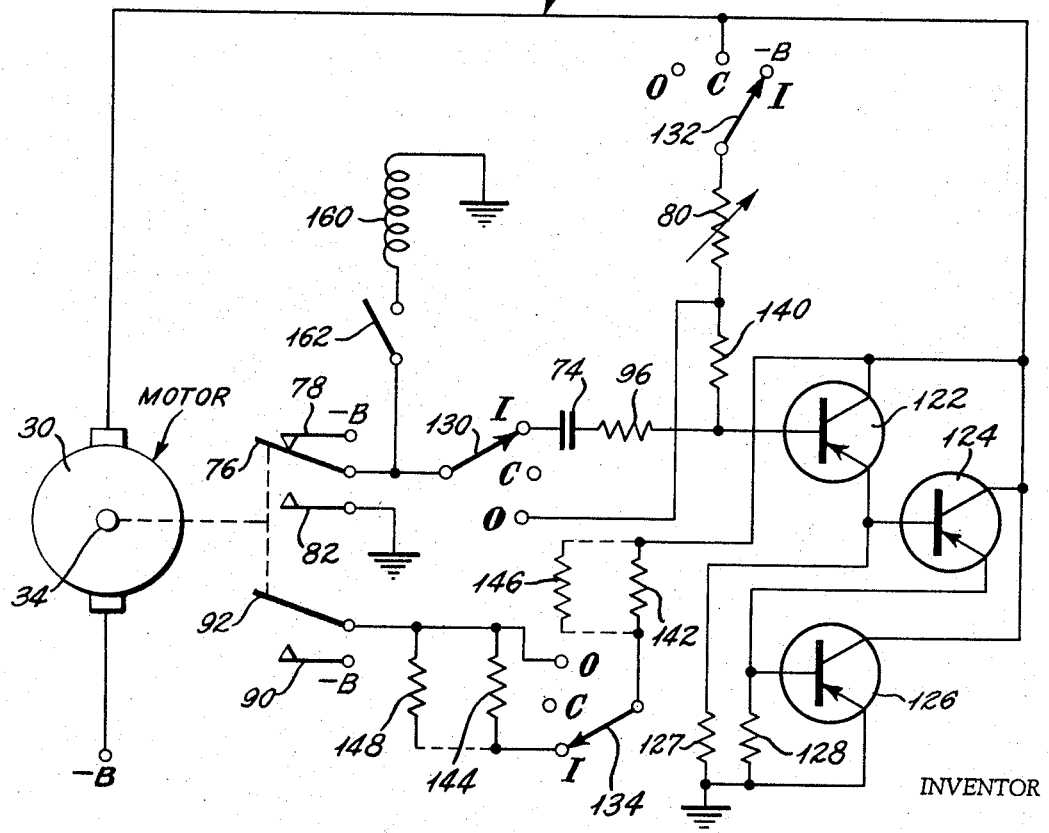

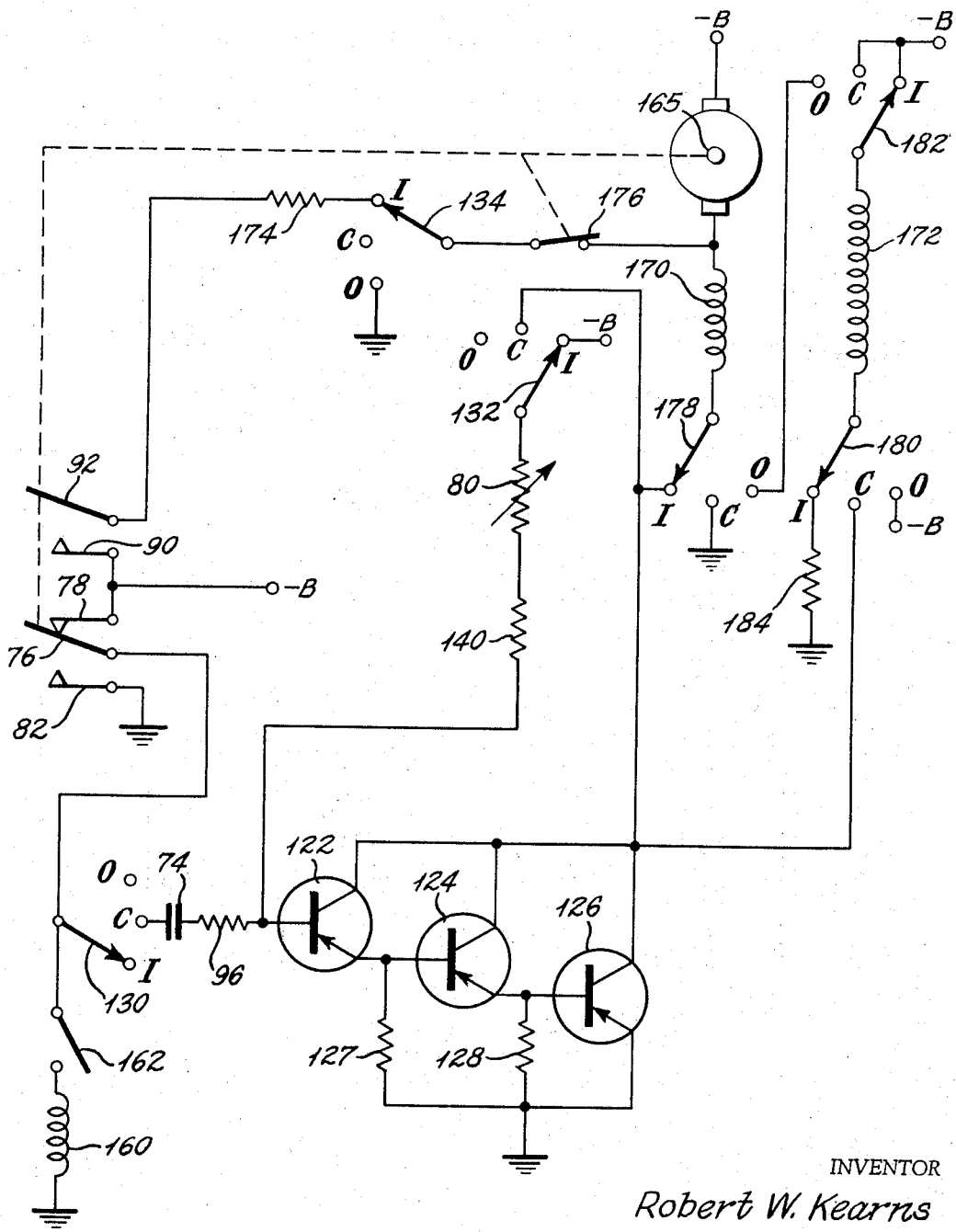

United States Patent Office 3,351,836
Patented Nov. 7, 1967

3,351,836
WINDSHIELD WIPER SYSTEM WITH INTERMITTENT OPERATION
Robert W. Kearns, Detroit, Mich., assignor, by mesne assignments, to Tann Company, Detroit, Mich., a partnership of Michigan
Filed Dec. 1, 1964, Ser. No. 414,973
19 Claims. (Cl. 318—443)

The present invention relates to windshield wiper systems and more particularly to a windshield wiper system of the intermittent type in which the wiper dwells for a time interval during a portion of each cycle of wiper operation.

Under certain conditions, such as light rain or splashback produced by other vehicles on wet roads, the condition of the windshield is often in what may be termed a wet-dry condition. Continuous windshield wiper operation with such a windshield condition may cause smearing to obscure the vision of the driver. The wiper element also may be inadequately lubricated, causing undue wear on the wiper blade. To overcome these problems, it is desirable to provide an intermittent operation in which the wiper dwells for an interval of time after a wiping operation and then automatically begins another cycle of operation.

During these intermittent dwell periods, the windstream against the windshield due to vehicle motion can be employed advantageously to dry and dissipate the thin film of vision obscuring moisture which is created by wiper operation over a wet-dry windshield. The intermittent operation also affords relief from monotony of wiper motion and prolongs the life of the wiper blades, the wiper motor and the wiper linkages, not only because of the intermittent rather than constant cycling, but also because the accumulation of moisture during dwell periods acts as a lubricant for the wipers during the next cycle of operation. The increased lubrication due to moisture accumulation on the windshield during dwell periods, plus the advantage of being able to run the wipers at a constant prescribed velocity, eliminates the tendency for the wipers to chatter. This definitely improves the quality of lesser wiping strokes and also prolongs the life of the rubber because it is not subjected to the wet-dry drag which normally acts to deteriorate the wiping lip and deposit rubber on the tacky glass surface.

However, when the water on the windshield increases due to increased rain, or wheel spray from a vehicle which is being passed, it is very desirable to sense this change in condition of the windshield, automatically switch the wiper system to continuous operation while this condition prevails and automatically switch back to intermittent operation when the condition no longer prevails. The patent to Ziegler 3,148,399, discloses a system of this general type which utilizes a thermal responsive switch element for disconnecting the motor from its power source after an indeterminate number of wiping cycles. However, operation of this wiper system is erratic and unreliable. The patent to Oishei et al., 3,110,056, discloses a cam actuated switching arrangement for causing a windshield wiper system to dwell at the end of each wiping cycle and provides an additional control responsive to acceleration of the vehicle for changing the intermittent operation to continuous operation. The latter contol includes a switch mounted for actuation by the accelerator pedal of the vehicle or means responsive to the engine intake manifold vacuum. Therefore it is apparent that this arrangement is not responsive to the condition of the windshield.

The present invention provides an intermittent windshield wiper system which is truly responsive to the condition of the windshield by utilizing the drag encountered by the wiper blades moving over the windshield to determine whether the wiper blades are stopped for a dwell period at the end of each cycle or whether the dwell period is skipped to provide continuous operation. In accordance with one embodiment of the invention involving an electric windshield wiper system for automotive vehicles, the electric motor is deenergized at a predetermined point near the end of each wiping cycle to initiate a decelerating period during which the motor continues to rotate through a small angle due to the momentum of the system. During the decelerating period, the drag encountered by the wiper blades moving over the windshield exerts a braking force on the motor which varies with the condition of the windshield. When the wiper blades are operating over a wet windshield, such as during a heavy rainfall, they are well lubricated and the braking force is very small. When the wiper blades are operating over a wet-dry windshield, the braking force is significantly greater and decelerates the windshield wiping system faster during the decelerating period so as to bring the motor to a complete stop in a fewer number of degrees as compared to a wet windshield. By selecting a number of degrees $\theta$ between these two position and automatically re-energizing the motor after $\theta$ degrees, an effective degree-of-dryness control is achieved. When the windshield is very wet, the motor is re-energized to start another wiping cycle before the windshield wipers come to a complete stop during the decelerating period. This skips the dwell period and provides continuous operation. When the windshield is wet-dry or dry, the windshield wipers come to a complete stop during the decelerating period before the rotor rotates through $\theta$ degrees. This starts a dwell period and suitable means is provided for energizing the motor at the end of the dwell period to start another cycle of operation.

In order to reduce the movement of the windshield wiper system during the decelerating period after the motor is de-energized near the end of a wiping cycle (that is, to reduce the angle $\theta$), additional means may be provided for decelerating the windshield wiper system. This can take the form of spring elements positioned to cooperatively engage elements of the windshield wiper system to absorb some of the kinetic energy of the system during the decelerating period, or electrical or mechanical braking means associated with the motor or other elements of the system. In the preferred embodiment, the motor is electrically braked by connecting a braking resistor thereacross to dynamically brake the motor during the decelerating period. The value of the resistor is carefully selected so as to cooperate with the drag encountered by the windshield wipers moving across the windshield to bring the system to a stop in a small number of degrees after the motor is de-energized, but still at different angular positions depending on the condition of the windshield. This in effect reduces the aforementioned angle $\theta$.

In accordance with another important feature of the invention, a transistor is employed in the control circuit for controlling the operation of the windshield wiper system. The transistor is shut OFF when the motor is de-energized near the end of each wiping cycle and automatically turned back ON by an RC time constant circuit to re-energize the motor after a predetermined dwell period of the system stops for a dwell period in response to the condition of the windshield. If the condition of the windshield dictates that the dwell period be skipped by re-energizing the motor before the system comes to a complete stop as described above, the transistor is automatically turned back ON after $\theta$ degrees of rotation to re-energize the motor and start the next cycle. The length of the dwell period is very conveniently controlled by a variable resistor in the RC time constant circuit.

The transistor control circuit just described also is very advantageous for producing intermittent operation without the automatically continuous feature. To assure a dwell period at the end of each cycle, regardless of the condition of the windshield, the value of the braking resistance is reduced significantly and this positively brakes the motor to a stop during the decelerating period at the end of each cycle, regardless of the condition of the windshield. The transistor control circuit is utilized as before to re-energize the motor and start the next cycle of operation after a predetermined dwell period and, in accordance with another important feature of the invention, the same transistor which is used to control the length of the dwell period during intermittent operation is also used to control the speed of the wiper motor when the driver manually sets the windshield wiper control for continuous operation instead of intermittent operation. By varying the same resistance which varies the RC time constant of the transistor to control the dwell period, infinite variations of speed can be provided during continuous operation from a very slow speed to the maximum speed.

Accordingly, it is one object of the invention to provide a windshield wiper control system for operating windshield wipers intermittently.

It is another object of the invention to provide a windshield wiper control system for automatically operating windshield wipers intermittently or continuously in response to the degree-of-dryness of the windshield.

It is a further object of the invention to provide a windshield wiper control system employing a transistor for providing intermittent operation of the windshield wipers.

It is a still further object of the invention to provide a windshield wiper control system employing a transistor for selectively operating the windshield wipers intermittently or continuously in a manner to enable the dwell period of the intermittent operation and the speed of the continuous operation to be controlled by the transistor.

It is a still further object of the invention to provide a windshield wiper control system wherein the wiper motor is deactivated for $\theta$ degrees near the end of each wiping cycle and the drag encountered by the wipers on the windshield determines whether the wipers stop at the end of a cycle for a dwell period or continue into the next wiping cycle.

It is a still further object of the invention to provide a windshield wiper system wherein the drag encountered by the wipers on the windshield during a predetermined portion of a wiping cycle is utilized to determine whether the wipers are stopped for a dwell period at the end of the cycle or continue directly into the next wiping cycle.

Other objects and features of novelty of the present invention will be specifically pointed out or will otherwise become apparent when referring, for a better understanding of the invention, to the following description taken in conjunction with the accompanying drawings, wherein:

FIG. 3 is a schematic circuit diagram of a second embodiment of a control system for producing intermittent windshield wiper operation in accordance with the invention;

FIG. 4 is a schematic circuit diagram of a third embodiment of a control system for producing intermittent windshield wiper operation in accordance with the invention; and FIG. 5 is a schematic circuit diagram of a fourth embodiment of a control system for producing intermittent windshield wiper operation in accordance with the invention.

Figure 1:
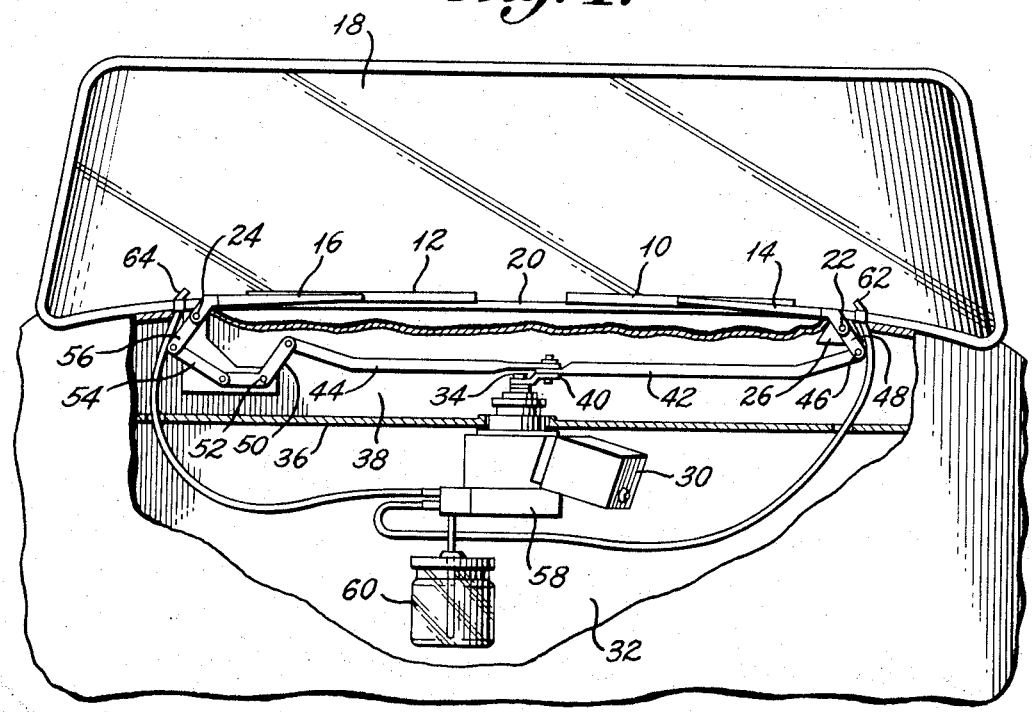
FIG. 1 is a fragmentary view, partly in section and partly in elevation, of an automotive vehicle equipped with the windshield wiper system of this invention.

Referring to FIG. 1, a windshield wiper system is shown comprising a pair of wiper blades 10 and 12 carried by arms 14 and 16 which oscillate the wiper blades across the outer surface of a windshield 18 having a lower reveal molding 20. The wiper arms 14 and 16 comprise conventional spring hinge connected inner and outer sections. The inner sections are drivingly connected to spaced pivot shafts 22 and 24 respectively, mounted beneath the lower reveal molding 20 and journalled in brackets 26 and 28, respectively. The wiper blades 10 and 12 are driven by a suitable motor, such as a hydraulic, pneumatic or electricmotor, which in this particular embodiment is an electric motor 30 attached to the fire wall 32 of the vehicle. The motor 30 has a rotating output shaft 34 which projects upwardly through the lower wall 36 of the plenum chamber 38 and has a radially extending crank arm 40 attached thereto which, in turn, has the inner ends of connecting links 42 and 44 rotatably connected thereto. The outer end of the link 42 is pivotally connected by a pin 46 to a crank arm 48 attached to the pivot shaft 22. The outer end of the connecting link 44 is pivotally connected to one end of a bell crank 50 which is pivotally mounted on the bracket 28 by a pin 52 intermediate the ends thereof. The other end of the bell crank 50 is pivotally connected to a link 54 which is pivotally connected to a crank arm 46 attached to the pivot shaft 24.

If desired, the wiper blades 10 and 12 can be oscillated throughout their running strokes and automatically moved to a depressed park position wherein they firmly engage the lower reveal molding 20 as illustrated in FIG. 1 when the wiper motor 30 is inactivated by the operator of the vehicle. Patent No. 2,985,024 illustrates one arrangement for automatically moving the wipers to the aforementioned depressed park position when the wipers are turned off by the operator of the vehicle. In addition, the wiper motor 30 may be used to drive a washer pump mechanism 58 for supplying cleaning fluid from a reservoir 60 to a pair of nozzles 62 and 64 mounted adjacent to the pivot shafts 22 and 24, respectively.

Figure 2:
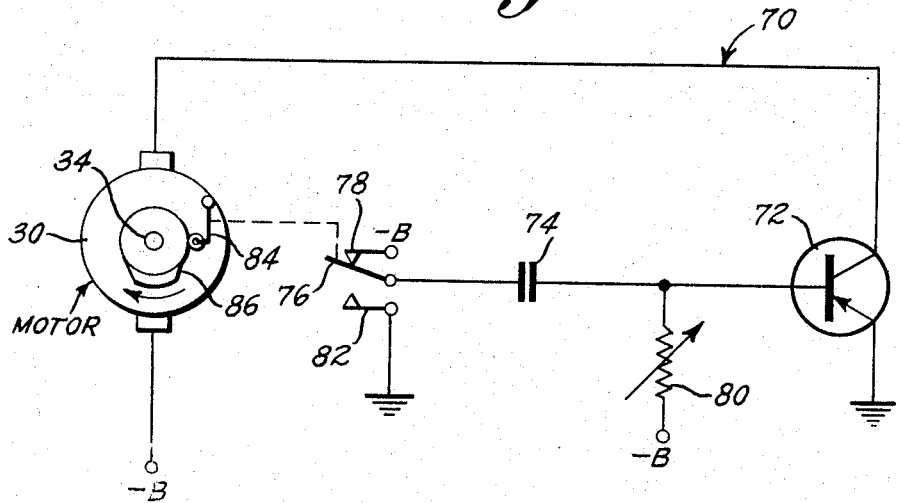
FIG. 2 is a schematic circuit diagram of one embodiment of a control system for providing intermittent windshield wiper operation in accordance with the invention.

Referring to FIG. 2, a control circuit 70 embodying features of the invention is illustrated for controlling the operation of the wiper motor 30 throughout the running cycle of the wiper blades 10 and 12. The motor is a single speed DC motor with a field provided by a permanent magnet. One side of the motor 30 is connected to a negative voltage —B (the negative terminal of the battery) and the other side is connected to ground through the collector and emitter of a transistor 72. The base of the transistor is connected to one side of a capacitor 74 with the other side of the capacitor connected to a movable contact 76 which normally engages a fixed contact 78 connected to the negative voltage —B. One side of a variable resistor 80 is connected between the capacitor 74 and the base of the transistor 72 and the other side is connected to the negative voltage —B. A stationary contact 82 connected to ground is positioned to be contacted by the movable contact 76.

The movable contact 76 is tripped near the end of a wiping cycle and remains in contact with the contact 82 for $\theta$ degrees of rotation of the motor output shaft 34 after which it is released and re-engages the contact 78. One way of accomplishing this is to provide a cam follower 84 which is actuated by a cam 86 which rotates with the output shaft 34 of the motor. In this embodiment, one complete revolution of the shaft 34 produces one complete wiping cycle of the wiper blades 10 and 12. That is, one complete revolution produces a forward stroke of the wiper blades and a return stroke back to the starting position of the wiping cycle. Of course, by simple gearing changes one revolution of the shaft 34 could be made to produce two or more strokes per cycle, if desired. The cam 86 has an arcuate length corresponding to the aforementioned angle $\theta$ and is designed to actuate the cam follower 84 to trip the movable contact 76 to break the circuit with the contact 78 and make the circuit with the contact 82 at a predetermined point near the end of the return stroke, that is, near the end of one complete wiping cycle, and to hold the movable contact 76 in this position while the shaft 34 rotates through a small angle of θ degrees. After the shaft 34 moves through the angle θ, the cam follower 84 drops off the cam 86 and the movable contact 76 returns to the position illustrated in FIG. 2.

The control circuit 70 operates in the following manner. The transistor 72 is ON when its base is negative and the collector is near ground. Consequently, full power from the negative voltage —B is applied to the motor 30 when the movable contact 76 engages the contact 78 as illustrated and the motor runs to operate the wiper blades through a wiping cycle. When the cam follower 84 shifts the movable contact 76 against the stationary contact 82 near the end of the return stroke of the wiping cycle, as previously described, the side of the capacitor connected to the movable 76 changes by an amount of voltage —B. Since the voltage across a capacitor cannot change instantaneously, the other side of the capacitor also changes by the voltage B. This makes the transistor base positive which turns the transistor OFF and the motor stops. The capacitor and variable resistor combination discharges, and after some discharge time, the transistor base again becomes negative to turn the transistor ON and energize the motor to start the next wiping cycle.

The momentum of the motor and wiper mechanism keeps the motor rotating through a small angle after the transistor 72 is turned OFF to de-energize the motor during the decelerating period as previously described, and the drag of the wiper blades 10 and 12 moving across the windshield applies a braking force to the motor during this decelerating period which is related to the degree-of-dryness of the windshield. The drier the windshield, the greater the rate of deceleration and the sooner the motor stops. The drag encountered by the wiper blades moving over the windshield also determines the velocity of the wiper blades at the time they enter into the decelerating period near the end of the return stroke of the wiping cycle. This, of course, has a direct bearing on the momentum of the motor and wiper mechanism.

If the motor 30 stops in less than θ degrees, the cam follower 84 remains on the cam 86 and the movable contact 76 remains in contact with the stationary contact 82. Therefore, the motor 30 is de-energized as long as the transistor 72 is OFF. As the capacitor 74 discharges through the variable resistor 80, the transistor base again becomes negative after a period of time, as previously described, and the transistor turns ON to start the next cycle. The time the transistor is OFF is the dwell period of the intermittent windshield wiper operation and the length of the dwell period can be controlled by the variable resistor 80. For example, the dwell period can be set anywhere from one to twenty seconds. When the transistor turns ON, to start another wiping cycle, the cam follower 84 drops off of the cam 86 to enable the movable contact 76 to return to the stationary contact 78, as illustrated in FIG. 2, to prepare the circuit for the next dwell period.

In the event a heavier rainfall is encountered, or water is sprayed on the wieldshield from a vehicle being passed, the dwell period is automatically skipped. The movable contact 76 is again tripped by the cam follower 84 near the end of the return stroke of the wiper blades 10 and 12 to turn the transistor OFF. However, since the wiper blades are operating over a wet windshield, the cam follower 84 drops off of the cam 86 before the motor is decelerated to a complete stop. As soon as this occurs, the movable contact 76 is tripped back to the position illustrated in FIG. 2 to turn the transistor 72 ON and energize the motor to start the next wiping cycle immediately and skip the dwell period. As long as the windshield remains wet, the dwell period at the end of each cycle will be skipped and the wiper blades will operate continuously. However, as soon as the rainfall decreases, or the vehicle is passed so that water from the road is no longer sprayed onto the windshield, the wiper blades will automatically stop for a predetermined dwell period at the end of each wiping cycle.

Referring to FIG. 3, a control circuit 71 is illustrated which reduces the aforementioned angle θ, or stated otherwise makes the motor 30 stop in a fewer number of degrees after it is de-energized at the end of a cycle. In this embodiment, the inertia of the load on the motor which tends to keep it moving after the motor has been de-energized is used to drive the motor as a generator during the decelerating period. To accomplish this, another switch section 88 is added as illustrated in FIG. 2 which includes a stationary contact 90 connected to the negative voltage —B and a movable contact 92 connected to one end of a brake resistor 94, the other end of the brake resistor being connected to the same side of the motor 30 as the transistor collector.

When the movable contacts 76 and 92 are tripped to engage the contacts 82 and 90, respectively, to start the decelerating period, the brake resistor 94 is connected across the motor armature which is the output when the motor is operating as a generator. Consequently, the kinetic energy of the system which drives the generator is converted to electrical energy which is dissipated in the brake resistor 94. This dynamically brakes the motor during the deceleration period to bring the motor to a complete stop in a fewer number of degrees after it has been de-energized. As before, the length of the dwell period is determined by the setting of the variable resistor 80.

By using a brake resistor 94 with a very low value, the motor can be made to stop almost immediately so that a dwell period will occur at the end of each wiping cycle regardless of the condition of the windshield. However, for a given windshield wiper system for a given vehicle, the value of the brake resistor 94 can be selected to cooperate with the drag encountered by the wiper blades moving over the windshield to produce intermittent operation when the windshield is in a wet-dry condition and to skip the dwell period to produce continuous operation when the windshield is in a wet condition.

To review the over all operation of the control circuit 71, the movable contacts 76 and 92 are tripped over a range of θ degrees which is determined by the arcuate length of the cam 86 which, in turn, is less than the arcuate length of the cam in FIG. 2 because of the electrical braking referred to above. Mechanical energy is dissipated in the system as the wiper blades move across the windshield surface. When the windshield is wet, viscous friction dominates and when the windshield is dry, coulomb friction dominates. At intermediate degrees-of-dryness, the effective friction coefficient varies which, in turn, regulates the amount of kinetic energy consumed mechanically. The inertia of the system, the decelerating period as determined by the angle θ, the geometry of the wiper system, the setting of the voltage regulator of the vehicle, and other relevant factors are all taken into account in establishing the valve of the brake resistor 94. By adjusting the system so that the motor 30 does not stop in θ degrees under wet windshield conditions, but does stop in θ degrees under wet-dry windshield conditions, the desired continuous or intermittent operation is achieved automatically. Thus, with a wet windshield, when the movable contacts 76 and 92 are tripped to initiate the decelerating, the kinetic energy is not dissipated in the angular region defined by the cam 86 and full power is again applied to continue into another wiping cycle. With an intermediate degree-of-dryness of the windshield (wet-dry), the kinetic energy is dissipated within the angular region θ and the motor comes to a complete stop. When the base becomes negative again to turn the transistor back ON, current goes from ground through the emitter and base of the transistor to charge the capacitor 74 to provide power for the next cycle through the emitter and collector of the transistor. The capacitor can charge very quickly and, as is well known, the collector current flows only when the base current flows. At full speed of the motor it takes about one second to complete a wiping cycle. Thus, if the capacitor charges too quickly, the wiper blades may not cycle under full power. When the motor loses power, the wiper blades may hesitate until the base times out longer and becomes more negative, and this hesitation would be distracting to the driver. In order to prevent hesitation a resistor 96 is placed in series with the capacitor 74 to limit the rate of charge of the capacitor so that it takes about one second for the capacitor to charge. This assures that a full wiping cycle occurs under full power.

In the embodiment of FIG. 3, the brake resistor 94 is used to dynamically brake the motor 30 electrically during the decelerating period. As stated previously, a mechanical brake could be employed to assist the drag of the wiper blades on the windshield in decelerating the motor. However, in its broader aspects, the invention also contemplates using other techniques for decelerating the wiper system in a manner to produce or skip the dwell period at the end of each wiping cycle. For example, a spring or other type of biasing force could be positioned to engage an element of the wiper system at a predetermined point in each wiping cycle to apply a controlled mechanical decelerating force thereto during the decelerating period to assist the drag of the wiper blades on the windshield in bringing the motor to a complete stop when the windshield is in a wet-dry condition to start a dwell period, and to skip the dwell period when the windshield is in a wet condition. It also will be appreciated that the decelerating period can occur at some other predetermined portion of each wiping cycle, such as nearer the beginning of the return stroke of the cycle, and a measurement made of the drag encountered by the wipers to determine whether the wipers are to be stopped for a dwell period at the end of the cycle, or whether the dwell period is to be skipped to produce continuous operation automatically.

In accordance with another feature of the invention, the control circuit 71 of FIG. 3 can be easily adapted to positively stop the wiper blades at the end of a wiping cycle under the control of the driver by simply adding a normally open switch 98 in position to short out part or all of the brake resistor 94 and a normally closed switch 100 between the variable resistor 80 and negative voltage —B. The dashboard of the vehicle would be provided with a suitable control knob having an intermittent position and an off position. When the driver turns the control knob to the intermittent position, the contacts of the control device 71 are positioned as illustrated in FIG. 3, and the wiper system operates intermittently or continuously depending on the condition of the windshield. When the driver turns the control knob to the off position, switch 98 closes to reduce the brake resistance and switch 100 opens to disconnect the variable resistor 80 from the negative voltage —B. The wipers will continue to operate until the end of the wiping cycle in progress at which time the cam 86 will trip the movable contacts 76 and 92 into engagement with the stationary contacts 82 and 90, respectively. This turns the transistor 72 OFF and since the value of the braking resistance is significantly decreased, the motor 30 positively will come to a complete stop before the cam 84 can ride off of the cam 86 regardless of the degree-of-dryness of the windshield. The transistor 72 cannot turn back ON because the switch 100 remains open in the off position and, therefore, the wiper system is completely deactivated with the blades stopped at the end of the return stroke, rather than in a depressed parked position as in the aforementioned Patent 2,985,024. In some systems presently being used on automotive vehicles, the motor armature is shorted to brake the motor when the wipers are turned off by the driver. However, in the control circuits 70 and 71 of FIGS. 2 and 3, it is very important that some brake resistance greater than zero be used for braking the motor during intermittent operation. When the transistor 72 turns ON at the end of each dwell period to start a new cycle, the load consists of the armature and braking resistor 94 in parallel. At standstill, the motor impedence is two ohms and the brake resistor 94 is two ohms, and the initial surge current which the transistor 72 must supply is approximately twelve amps. As the motor rotates, the impedance of the armature increases and the brake resistor 94 is removed after a few degrees of rotation when the cam follower 84 rides off of the cam 86. It is apparent that if the brake resistor 94 were zero (the equivalent of shorting the motor armature) the transistor surge current would have to be infinite.

Referring to FIG. 4, a control circuit 120 is shown which illustrates a more sophisticated embodiment of the invention. In this embodiment, three transistors 122, 124 and 126, are used in place of the single transistor 72. It will be noted that all three collectors are tied together as one transistor and that all three emitters are connected to ground with resistors 127 and 128 provided for temperature compensation. By using the three transistors, in place of the one transistor 72 used in the control circuits 70 and 71, the cost can be significantly reduced because each of the three transistors can be a cheaper grade transistor. With the present state of the art, the three transistors have a total cost which is less than the cost of the single transistor 72 which must be of a much higher quality. Of course, two transistors could be used or additional transistors added to the three transistors if additional economies could be realized.

The collectors of the transistors 122–126 are connected to one side of the motor 30 and the other side of the motor is connected to a negative voltage —B as previously described. The movable contacts 76 and 92 are provided as before along with stationary contacts 78, 82 and 90, contacts 78 and 90 being connected to the negative voltage —B and contact 82 being connected to ground. As in the embodiments of FIGS. 2 and 3 the movable contacts 76 and 92 are mechanically tripped to engage the stationary contacts 82 and 90 for θ degrees of rotation of the motor shaft 34 to define the decelerating period near the end of each wiping cycle.

In this embodiment the control knob (not shown) which is mounted on the dashboard in a position to be operated manually by the driver has three sets or sections of stationary contacts, I, C and O adapted to be selectively engaged by movable contacts 130, 132 and 134. With this arrangement, the driver can adjust the control knob manually to provide intermittent operation, continuous operation, or to turn the wipers off. The movable contacts 130–134 engage stationary contacts I to provide intermittent operation, engage the stationary contacts C to provide continuous operation, and engage the stationary contacts O to turn off or deactivate the wipers as will be described.

The movable contact 76 is connected directly to the movable contact 130 and one side of the capacitor 74 is connected to the stationary contact I associated with the movable contact 130. The other side of the capacitor 74 is connected to the resistor 96 and the other end of the resistor 96 is connected directly to the base of the transistor 122. As will be recalled, the function of the resistor 96 in the previous embodiment is to prevent the capacitor 74 charging too quickly so that full power will be supplied to the motor during a complete wiping cycle. The resistor 96 serves the same function in this embodiment. One end of the variable resistor 80 is connected to a resistor 140 which in turn is connected to the juncture between the resistor 96 and the base of the transistor 122. The other end of the variable resistor 80 is connected to the movable contact 132 so that it will be connected to the negative voltage —B when the movable contact 132 engages the stationary contact I as illustrated. The stationary contact C associated with the movable contact 132 is connected directly to the side of the motor to which the transistor collectors are connected. The juncture between the variable resistor 80 and the resistor 140 is connected directly to the stationary contact O associated with the movable contact 130.

The movable contact 134 is connected to one end of the brake resistor 142 and the other end of the brake resistor is connected directly to the same side of the motor 30 to which the collectors of the transistors are connected. A second braking resistor 144 is connected between the stationary contact I associated with the movable contact 134 and the movable contact 92. If desired, additional braking resistors 146 and 148 may be connected in parallel with the brake resistors 142 and 144, respectively, to reduce the value of the total resistance. During intermittent operation the brake resistors 142 and 144 perform the same function as the brake resistor 94 in the previous embodiments, as will be described.

When the driver turns the wipers on intermittent operation by means of the control knob on the dashboard of the vehicle, each of the movable contacts 130–134 engage the stationary contacts I as illustrated in FIG. 4. Assuming the movable contact 76 engages the stationary contact 78, the base of the transistor 122 is connected to the negative voltage —B through the movable contact 130, the capacitor 74 and the resistor 96 so that the transistors are ON. Therefore, the motor 30 is energized because the circuit from the negative voltage —B through the motor to ground is completed through the collectors and emitters of the transistors 122–126 since they are ON. While the motor is energized to provide the power for the wiping cycle in progress, the movable contact 92 is in the position illustrated out of engagement with the stationary contact 90 so that the brake resistors 142 and 144 are not connected in the circuit. As the wiper blades near the end of the return stroke of the wiping cycle, the movable contacts 76 and 92 are mechanically tripped, as in the previous embodiments, to engage the stationary contacts 82 and 90, respectively. This turns the transistors OFF and de-energizes the motor 30 as before, and connects the brake resistors 142 and 144 in series across the motor to provide the electrical brake provided by the resistor 94 in the previous embodiments.

Depending upon the degree-of-dryness of the windshield the motor will either continue to rotate through the angle θ and thereafter release the movable contacts 76 and 92 to re-energize the motor to start another wiping cycle (continuous operation), or the motor will come to a stop before the movable contacts 76 and 92 are released so that the wiper blades will dwell for a period determined by the length of time the transistors 122–126 are OFF. As in the previous embodiments the transistors will remain OFF until the capacitor 74 discharges sufficiently to make the base of the transistor 122 negative to turn the transistor 122 and the other two transistors back ON. The variable resistor 80 can be adjusted to control the length of the dwell period. When the transistors turn back ON, the motor 30 is energized to start another wiping cycle and the movable contacts 76 and 92 trip back to the position illustrated in FIG. 4 as soon as the motor rotates through a few degrees.

When the driver turns the dashboard control knob to the continuous position, the movable contacts 130–134 each engage the stationary contacts C associated therewith. This removes the brake resistors 142 and 144 from the circuit and also removes the resistor 96 and capacitor 74 from the circuit. However, the base of the transistor 122 is connected to the same side of the motor 30 as the collectors of each of the transistors. This circuit can be followed through the resistor 140, the variable resistor 80, the movable contact 132 and stationary contact C. In this position the transistors 122–126 are always ON due to the current flow from the motor through the base-emitter circuits of each of the transistors to ground. Therefore the motor is continuously energized because it is connected directly to ground through the collector-emitter circuits of each of the transistors. An important advantage of this circuit is that the variable resistor 80 which is used to control the length of the dwell period during intermittent operation also can be used to vary the speed of the motor 30 in the continuous operation position. By adjusting the value of the variable resistor 80 the current flow through the base-emitter circuits of each of the transistors can be adjusted to control the magnitude of the primary current flow to the motor through the emitter-collector circuits of each of the transistors. This variable speed control will be described in greater detail hereinafter.

As previously described, in some more sophisticated windshield wiper control systems presently in use, the windshield wipers are automatically parked in a depressed park position adjacent the windshield wiper molding when they are turned off, instead of being parked one-half to one inch above the reveal molding as they are in systems which merely stop the wipers at the end of a wiper stroke. The circuit of FIG. 5 shows the present invention applied to a wiper control system for Chrysler automobiles which automatically parks the wipers in a depressed park position. The circuit shown in FIG. 5 is similar to that shown in FIG. 4 except that the circuit makes use of a Chrysler wiper motor having a series field winding 170 and a shunt field winding 172 instead of a permanent magnet field. The armature of the wiper motor in FIG. 5 is designated by the reference number 165. The transistors 122, 124 and 126 are connected together and to the resistors 127 and 128 in the same manner that they are connected in FIG. 4. Also, the movable contact 132 is connected to the base of the transistor 122 through the series circuit of the resistors 80 and 140 in the same manner as in FIG. 4. Similarly, the stationary contact I associated with the movable contact 130 is connected to the base of the transistor 122 through the capacitor 74 and the resistor 96 in the same manner as in FIG. 4. The movable contacts 130 and 76 and the stationary contacts 78 and 82 are also connected in the same manner as in FIG. 4 and the washer motor 160 and the washer switch 162 are connected to the circuit in the same manner as in FIG. 4. The stationary contact C associated with movable contact 130 is open circuited as in the circuit of FIG. 4. However, the stationary contact O associated with the movable contact 130 is open circuited instead of being connected to the junction between the resistors 80 and 140. The stationary contact 90 is connected to —B potential and the movable contact 92 is connected to the stationary contact I associated with the movable contact 134 through a single brake resistor 174. The stationary contact O associated with the movable contact 134 is connected directly to ground. The stationary contact C associated with the movable contact 134 is open circuited. The movable contact 134 is connected to the junction between the armature 165 and the series field winding 170 through a normally closed switch 176. The stationary contact O associated with the movable contact 132 is open circuited, and the stationary contact I is connected to —B potential. The stationary contact C associated with the movable contact 132 is connected to the collectors of the transistors 122–126 as in the circuit of FIG. 4. However, the stationary contact C associated with the movable contact 132 and the collectors of the transistors 122 and 124 and 126 are connected to the wiper motor in a different manner from the circuit of FIG. 4, as will be described.

To control the operation of the wiper motor, three additional movable contacts, 178, 180 and 182 are provided to be operated by the dashboard-mounted control knob, together with the movable contacts 130, 132 and 134. Accordingly, the movable contacts 178, 180 and 182 each have associated therewith three stationary contacts, I, C and O. The commonly connected collectors of the transistors 122, 124 and 126 as well as the stationary contact C associated with the movable contact 132 are all connected to the stationary contact I associated with the movable contact 178 and to the stationary contact C associated with the movable contact 180. The series field winding 170 connects the movable contact 178 to one side of the armature 165, the other side of which is connected to —B potential. The stationary contact C associated with the movable contact 178 is connected to ground, and the stationary contact O associated with the movable contact 178 is connected to the stationary contact O associated with the movable contact 182. The shunt field 172 connects the movable contacts 180 and 182 together. The stationary contact I associated with the movable contact 180 is connected to ground through a resistor 184 and the stationary contact O associated with the movable contact 180 is connected to —B potential. The stationary contacts I and C associated with the movable contact 182 are also connected to —B potential.

The speed of operation of wiper motor armature 165 is controlled by the amount of current flowing through the shunt field winding 172. The motor speed is inversely proportional to this field current and, therefore, the greater the current flow through the field winding 172, the slower the motor will operate and vice versa. When the dashboard control knob is turned to the continuous position by the driver, it will be noted that an armature 165 and the series field winding 170 will be connected between —B potential and ground and the shunt field winding 172 will be connected between —B and the collectors of the transistors 122, 124 and 126, the collectors also being connected to the base of the transistor 122 through the variable resistor 80 and the resistor 140. Thus, the current through the shunt field winding 172 during the continuous operation will be controlled by the transistors 122, 124 and 126 in accordance with the value of the resistor 80 in the same manner as the current through the wiper motor 30 in the circuit of FIG. 4 is controlled during continuous operation. Thus, the speed of the wiper motor in the circuit of FIG. 5 will be controlled during continuous operation by means of variable resistor 80. It should be noted, however, that in the circuit of FIG. 5 the speed will be changed in the opposite direction from that of the circuit of FIG. 4 in response to changes in the value of the resistor 80 in a given direction.

When the dashboard control knob is moved to the off position, a series circuit will be formed comprising the series field winding 170 and the shunt field winding 172 connected between the —B potential applied at the stationary contact O associated with the movable contact 180 and ground applied at the stationary contact O associated with the movable contact 134. As a result current will flow through the field windings 172 and 170 in the reverse direction. Also, the armature 165 will be connected between —B potential and ground applied at the stationary contact O associated with the movable contact 134. Because current flows through field windings 170 and 172 in the reverse direction, the motor will drive the wiper blades in the reverse direction. The Chrysler system is arranged so that when the wiper motor is driven in the reverse direction, the wipers move to the depressed park position. Upon reaching the depressed park position the normally closed switch 176 is opened by a cam (not shown) which functions to open the switch 176 only when the motor is moving in the reverse direction. When the switch 176 opens, power is disconnected from the field windings 170, 172 and from the armature 165 so that the motor stops and the wipers are stopped in the depressed park position. Since the mechanism for moving the wipers to depressed park and camming the switch 176 open is part of a conventional Chrysler wiping system, it has not been illustrated.

When the dashboard control knob is turned to the intermittent position, the shunt field winding 172 will be connected in series with resistor 184 between —B potential and ground so that current flows through the shunt field winding 172 in the forward direction. The armature 165 will be connected in series with the series field winding 170 between —B potential and the collectors of the transistors 122, 124 and 126. The junction between the armature 165 and the series field winding 170 will be connected through the resistor 174 to the movable contact 92. The circuit will then function in a manner similar to that in FIG. 4. When the transistors 122, 124 and 126 are conducting, as they will be when the movable contacts 76 and 92 are in the position shown in FIG. 5, current will flow from —B potential through the armature 165, the field winding 170 and the transistors 122, 124 and 126 to ground and the wiper motor will drive the wipers at a speed determined by the current flowing in the field winding 172 which, in turn, is determined by the resistor 184.

When the wipers approach the end of the return stroke, the movable contact 92 engages the contact 90 and the contact 76 disengages from the contact 78 and engages the contact 82. As a result, a positive potential is applied at the base of the transistor 122, cutting the transistors 122, 124 and 126 OFF. At the same time, the resistor 174 is connected across the armature 165, providing electrodynamic braking of the wiper motor. If the electrodynamic braking, together with the mechanical braking of the drag of the wipers on the windshield, is sufficient to stop the motor in less than $\theta$ degrees, a dwell period is produced until the capacitor 74 can become sufficiently charged through the resistors 80, 140 and 96, to turn the transistors 122, 124 and 126 ON again to re-energize the wiper motor and start another wiping cycle. If the mechanical braking, together with electrodynamic braking, is insufficient to stop the motor in $\theta$ degrees (the decelerating period) the contacts 76 and 92 return to the position illustrated and automatically reenergize the motor in the same manner as in the circuit of FIG. 4 to skip the dwell period. The duration of the dwell period, as in the circuit of FIG. 4, is determined by the value of the resistor 80.

The point at which the system automatically switches between continuous operation and intermittent operation can be controlled by adjusting the value of the brake resistor 174 or the value of the resistor 184. The value of the brake resistor determines the amount of electrodynamic braking as already described, and the value of the resistor 184 controls the speed of the wiper motion. If the value of the resistor 184 is decreased to increase the wiper motor speed, more braking action will be required to stop the wipers in the decelerating period of the wiping cycle. Thus a decrease in the value of the resistor 184 will cause automatic switch between continuous and intermittent to take place when the windshield is drier. Similarly an increase in the value of the resistor 184 will cause the automatic switching to take place when the windshield is wetter. Preferably, however, the value of the resistor 184 is selected to produce the desired wiper speed and the value of the brake resistor 174 is selected to determine the degree-of-dryness of the windshield at which the automatic switching takes place. If desired the brake resistor 174, as well as the brake resistors of the other embodiments, can be made variable to enable the automatic switching point to be adjusted to meet the preference of the owner of the vehicle. This also would provide a convenient means for making any future adjustment which might be necessary after a prolonged period of operation.

While it will be apparent that the embodiments of the invention disclosed herein are well calculated to fulfill the objects of the invention, it will be appreciated that the invention is susceptible to variation, modification and change without departing from the proper scope or fair meaning of the appended claims.

What is claimed is:

1. In a windshield cleaning system, an electric windshield wiper motor unit for driving wiper means through repeating wiping cycles, and control means for automatically deenergizing said motor near the end of each wiping cycle for a predetermined dwell period, said control means comprising transistor means for de-energizing the motor when the transistor means is turned off and energizing the motor when the transistor means is turned on, capacitive timing means to determine said predetermined dwell period, and switch means responsive to the position of said motor unit for conditioning said capacitive timing means to bias said transistor means off for said predetermined dwell period near the end of each of said wiping cycles.

2. The system as claimed in claim 1 wherein said control means includes variable resistance means, and manually activated switch means for selectively connecting said variable resistance means to said transistor means for varying the length of time of each of said dwell periods, and connecting said transistor means and variable resistance means and motor in a circuit for providing continuously repeating wiping cycles without dwell periods with said variable resistance means connected to said transistor means in a manner to control the speed of said motor.

3. In combination, a vehicle having a windshield, and a windshield wiper cleaning system comprising wiper blade means drive means for driving said wiper blade means across a windshield in repeating wiping cycles and means for dynamically braking said drive means with a predetermined braking force during a predetermined portion of each wiping cycle, said predetermined braking force being insufficient to stop said wiper means in said portion of a cycle when the wiper means is operating over a wet windshield and being sufficient to stop said wiper means in said portion of a cycle when the wiper means is operating over a semi-dry windshield.

4. In combination with a vehicle having a windshield, a windshield cleaning system comprising wiper blade means slidably engaging said windshield, motor actuated drive means for driving said wiper blade means through repeating wiping cycles, and automatic control means for activating said drive means to drive said wiper blade means through said repeating wiping cycles, said automatic control means including means for automatically varying the time between wiping cycles in response to the degree of dryness of the windshield.

5. The invention as defined in claim 4 wherein said automatic control means includes means to sense the kinetic energy of said system during at least a portion of each wiping cycle and means to vary the starting time of the next wiping cycle in response to the magnitude of the kinetic energy sensed during the wiping cycle.

6. The invention as defined in claim 4 wherein the said automatic control means includes means for de-celerating said system during a pre-determined portion of each wiping cycle, and means for varying the starting time of the next wiping cycle in response to the magnitude of kinetic energy removed from the system during said portion of each wiping cycle.

7. The invention as defined in claim 6 wherein said decelerating means includes means for applying a pre-determined braking force to said drive means.

8. The invention as defined in claim 6 wherein said last mentioned means automatically produces a dwell period between wiping cycles when the kinetic energy drops due to a wet-dry windshield condition and automatically skips said dwell period between wiping cycles when the kinetic energy increases due to a wet windshield.

9. The invention as defined in claim 6 wherein said predetermined portion of each wiping cycle is a $\theta$ region near the end of each wiping cycle and wherein said automatic control means includes means to de-activate said drive means during said $\theta$ region to cause said wiper blade means to de-celerate.

10. The invention as defined in claim 9 wherein said automatic control means includes means for applying a predetermined braking force to said drive means in said $\theta$ region, the combination of said braking force and the deactivating of said drive means causing said wiper blade means to stop in said $\theta$ region when the windshield is in a wet-dry condition and causing said wiper blade means to coast through said $\theta$ region when the windshield is in a wet condition, and means for reactivating said drive means after a predetermined dwell period when said wiper blade means comes to rest in said $\theta$ region and reactivating said wiper blade means immediately when said wiper blade means coasts through said $\theta$ region.

11. The invention as defined in claim 9 wherein said motor is an electric motor and said automatic control means includes transistor switch means for energizing said motor to initiate and complete a wiping cycle and deenergizing said motor during said $\theta$ region, and capacitive timing means for controlling the OFF time of said transistor switch means when said wiper blade means stops in said $\theta$ region.

12. In a windshield cleaning system, electric motor driven windshield wiper drive means for driving wiper blade means across the windshield in repeating wiping cycles, and automatic control means for energizing said motor intermittently to produce complete wiping cycles with each wiping cycle followed by a predetermined dwell period, said control means including transistor switch means for energizing said motor to initiate a wiping cycle and deenergizing said motor to terminate a wiping cycle, timing means to determine said predetermined dwell period, and switch means responsive to the position of said drive means for conditioning said timing means to bias said transistor switch means off at the end of each wiping cycle for said predetermined dwell period.

13. The invention as defined in claim 4 wherein the number of wiping cycles per unit time varies in response to the degree of dryness of the windshield with the number of wiping cycles increasing when the windshield is wetter and decreasing when the windshield is drier, and wherein said automatic control means includes manually adjustable means for adjusting variation in the wiping cycles in response to the degree of dryness of the windshield.

14. In a windshield cleaning system, an electric windshield wiper motor unit for driving wiper blade means through repeating wiping cycles, and control means for automatically de-energizing said motor near the end of each wiping cycle for a pre-determined dwell period, said control means comprising electronic circuit means responsive to the position of the motor for deenergizing the motor near the end of each wiping cycle for a pre-determined dwell period and re-energizing the motor to initiate the next wiping cycle at the end of said pre-determined dwell period, manually adjustable variable resistance means for adjusting the length of said dwell periods, and manually activated switch means for selectively connecting said variable resistance means in a first position wherein the variable resistance means controls the length of time of each of said dwell periods and a second position wherein said electronic circuit means and variable resistance means and motor are connected to provide continuously repeating wiping cycles without dwell periods with said variable resistance means connected in a manner to control the speed of said motor.

15. The invention as defined in claim 12 wherein said timing means comprises a capacitor, means for charging the capacitor during a portion of a wiping cycle, and means for discharging said capacitor at a controlled rate, and wherein said switch means conditions said capacitor to apply a potential to said transistor switch means and to said discharging means to bias the transistor switch means off until the capacitor discharges sufficiently through said discharging means to enable said transistor switch means to turn on to start another wiping cycle.

16. The invention as defined in claim 12 wherein said automatic control means includes manually activated switch means for selectively connecting said drive means and transistor switch means in a continuous position for continuous operation of the drive means without dwell periods and in an intermittent position for said intermittent operation of said drive means.

17. The invention as defined in claim 4 wherein said automatic control means includes manually activated switch means having an intermittent position and an off position for selectively connecting said drive means and automatic control means for said intermittent operation when in said intermittent position and for an off mode of operation when in said off position, and includes means activated in said off mode of operation to terminate the wiping operation at the end of the wiping cycle in progress regardless of the amount of moisture on the windshield.

18. The invention as defined in claim 12 wherein said transistor switch means is connected in circuit with said motor in a manner to normally energize said motor during the dwell periods, said timing means being a capacitive timing means superimposing a biasing potential on the base of said transistor switch means for biasing said transistor switch means off until said capacitive timing means discharges sufficiently to bias said transistor switch means on.

19. The invention as defined in claim 4 wherein the number of wiping cycles per unit time varies in response to the degree of dryness of the windshield with the number of wiping cycles per unit time increasing when the windshield is wetter and decreasing when the windshield is drier.

References Cited

UNITED STATES PATENTS

| | | | |
|---|---|---|---|
| 2,357,152 | 8/1944 | Whitted. | |
| 3,219,901 | 11/1965 | Foreman et al. | 318—443 |
| 3,262,042 | 7/1966 | Amos | 318—443 |

ORIS L. RADER, *Primary Examiner.*

J. C. BERENZWEIG, J. J. BAKER, *Assistant Examiners.*